(12) United States Patent
Van Phan et al.

(10) Patent No.: US 10,091,710 B2
(45) Date of Patent: Oct. 2, 2018

(54) METHOD AND APPARATUS FOR FACILITATING DEVICE-TO-DEVICE COMMUNICATIONS

(71) Applicant: NOKIA SOLUTIONS AND NETWORKS OY, Espoo (FI)

(72) Inventors: Vinh Van Phan, Oulu (FI); Ling Yu, Kauniainen (FI); Kari Veikko Horneman, Oulu (FI); Zexian Li, Espoo (FI); Kodo Shu, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/024,875

(22) PCT Filed: Sep. 24, 2014

(86) PCT No.: PCT/EP2014/070337
§ 371 (c)(1),
(2) Date: Mar. 25, 2016

(87) PCT Pub. No.: WO2015/044183
PCT Pub. Date: Apr. 2, 2015

(65) Prior Publication Data
US 2016/0219394 A1 Jul. 28, 2016

Related U.S. Application Data

(60) Provisional application No. 61/883,528, filed on Sep. 27, 2013.

(51) Int. Cl.
*H04W 48/14* (2009.01)
*H04W 76/14* (2018.01)
(Continued)

(52) U.S. Cl.
CPC ............. *H04W 48/14* (2013.01); *H04W 4/08* (2013.01); *H04W 4/80* (2018.02); *H04W 24/02* (2013.01);
(Continued)

(58) Field of Classification Search
None
See application file for complete search history.

(56) References Cited

U.S. PATENT DOCUMENTS

2003/0128690 A1* 7/2003 Elliott ................... H04W 8/005
370/351
2004/0235489 A1 11/2004 Kwon
(Continued)

FOREIGN PATENT DOCUMENTS

EP  1 528 717 A1  5/2005
EP  2 739 087 A1  6/2014
(Continued)

OTHER PUBLICATIONS

International Search Report & Written Opinion dated Dec. 17, 2014 corresponding to International Patent Application No. PCT/EP2014/070337.
(Continued)

*Primary Examiner* — David Bilodeau
(74) *Attorney, Agent, or Firm* — Squire Patton Boggs (US) LLP

(57) ABSTRACT

A method and apparatus can be configured to update status information on channel resources. The channel resources are configured for device-to-device communication by a cluster-wise manner. The method can also include transmitting the status information by using broadcasting resources.

10 Claims, 5 Drawing Sheets

(51) Int. Cl.

| | | |
|---|---|---|
| *H04W 4/80* | (2018.01) | |
| *H04W 72/04* | (2009.01) | |
| *H04W 4/08* | (2009.01) | |
| *H04W 74/00* | (2009.01) | |
| *H04W 74/04* | (2009.01) | |
| *H04W 24/02* | (2009.01) | |
| *H04W 48/16* | (2009.01) | |
| *H04W 48/20* | (2009.01) | |
| *H04W 84/18* | (2009.01) | |
| *H04W 84/20* | (2009.01) | |
| *H04W 48/12* | (2009.01) | |
| *H04W 92/18* | (2009.01) | |

(52) U.S. Cl.
CPC ........... *H04W 48/16* (2013.01); *H04W 48/20* (2013.01); *H04W 72/0453* (2013.01); *H04W 74/006* (2013.01); *H04W 74/04* (2013.01); *H04W 76/14* (2018.02); *H04W 48/12* (2013.01); *H04W 84/18* (2013.01); *H04W 84/20* (2013.01); *H04W 92/18* (2013.01)

(56) References Cited

U.S. PATENT DOCUMENTS

| | | | |
|---|---|---|---|
| 2005/0090264 A1* | 4/2005 | Kim | H04W 48/10 455/455 |
| 2006/0030318 A1 | 2/2006 | Moore et al. | |
| 2006/0268738 A1 | 11/2006 | Goerke et al. | |
| 2007/0153747 A1 | 7/2007 | Pan et al. | |
| 2009/0285149 A1 | 11/2009 | Kwon et al. | |
| 2010/0074133 A1* | 3/2010 | Kim | G01S 5/0289 370/252 |
| 2010/0309818 A1 | 12/2010 | Kim et al. | |
| 2011/0159799 A1 | 6/2011 | Chen et al. | |
| 2012/0093098 A1 | 4/2012 | Charbit et al. | |
| 2013/0242866 A1 | 9/2013 | Lin et al. | |
| 2013/0301438 A1 | 11/2013 | Li et al. | |
| 2015/0127733 A1* | 5/2015 | Ding | H04W 4/08 709/204 |
| 2015/0373657 A1* | 12/2015 | Kim | H04W 56/0015 370/350 |
| 2016/0037323 A1* | 2/2016 | Kim | H04W 8/005 370/329 |
| 2016/0050552 A1* | 2/2016 | Kim | H04W 8/005 455/434 |

FOREIGN PATENT DOCUMENTS

| | | |
|---|---|---|
| WO | WO 2010/102668 A1 | 9/2010 |
| WO | WO 2012/159270 A1 | 11/2012 |
| WO | WO 2013/013510 A1 | 1/2013 |

OTHER PUBLICATIONS

International Search Report & Written Opinion dated Oct. 28, 2014 corresponding to International Patent Application No. PCT/EP2014/068923.

LG Electronics Inc.: "Issues in D2D communication," 3GPP Draft; R2-133579, 3GPP TSG-RAN WG2 #83bis, Ljubljana, Slovenia, Oct. 7-11, 2013, pp. 1-3.

Vodafone et al.: "Agreements from TSG RAN on work on Public Safety related use cases in Release 12," 3GPP Draft; RP-131377, TSG RAN Meeting #61, Porto, Portugal, Sep. 3-6, 2013, pp. 1-6.

European Search Report issued in corresponding European Patent Application No. 17171946.1 dated Oct. 10, 2017.

* cited by examiner

METHOD AND APPARATUS FOR FACILITATING DEVICE-TO-DEVICE COMMUNICATIONS

BACKGROUND

Field

Embodiments of the invention relate to a method and apparatus for facilitating device-to-device communications.

Description of the Related Art

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

SUMMARY

According to a first embodiment, a method can comprise updating, by a cluster head or a cluster manager, status information on channel resources. The channel resources are configured for device-to-device communication by a cluster-wise manner. The method can also include transmitting, by the cluster head or the cluster manager, the status information by using broadcasting resources.

In the method of the first embodiment, the updating comprises monitoring free and/or occupied channel resources within the cluster in charge of the cluster head considering other interfering clusters.

In the method of the first embodiment, the method can also include determining a limited set of free channel resources to be included in the updated status information based on monitoring free and/or occupied channel resources within the cluster, and a capability and a condition of the cluster head.

In the method of the first embodiment, the method can also include receiving a request message from a cluster member enabled to perform device-to-device communication. The request message requests that the cluster member be authorized to occupy at least one channel of the channel resources.

In the method of the first embodiment, the method can also include transmitting channel information, the channel information comprising at least one of the following: information about channel configuration, transmission mode, resource allocation, scheduling information, radio service and/or service profile thereof, and Quality of Service parameters.

In the method of the first embodiment, the method can also include allocating at least one signaling channel for signaling with cluster members, in which the signaling channel may be used for the transmitting alongside with the broadcasting resources or exclusively.

According to a second embodiment, an apparatus can comprise at least one processor. The apparatus can also include at least one memory including computer program code. The at least one memory and the computer program code can be configured, with the at least one processor, to cause the apparatus at least to update status information on channel resources. The channel resources are configured for device-to-device communication by a cluster-wise manner. The apparatus can also transmit the status information by using broadcasting resources.

In the apparatus of the second embodiment, the updating comprises monitoring free and/or occupied channel resources within the cluster in charge of the cluster head considering other interfering clusters.

In the apparatus of the second embodiment, the apparatus is further caused to determine a limited set of free channel resources to be included in the updated status information based on monitoring free and/or occupied channel resources within the cluster, and a capability and a condition of the cluster head.

In the apparatus of the second embodiment, the apparatus is further caused to receive a request message from a cluster member enabled to perform device-to-device communication, wherein the request message requests that the cluster member be authorized to occupy at least one channel of the channel resources.

In the apparatus of the second embodiment, the apparatus is further caused to transmit channel information, the channel information comprising at least one of the following: information about channel configuration, transmission mode, resource allocation, scheduling information, radio service and/or service profile thereof, and Quality of Service parameters.

In the apparatus of the second embodiment, the apparatus is further caused to allocate at least one signaling channel for signaling with cluster members, in which the signaling channel may be used for the transmitting alongside with the broadcasting resources or exclusively.

In the apparatus of the second embodiment, the apparatus is a cluster head or cluster manager.

According to a third embodiment, a computer program product can be embodied on a non-transitory computer readable medium. The computer program product can be configured to control a processor to perform a process comprising updating, by a cluster head, status information on channel resources, wherein the channel resources are configured for device-to-device communication by a cluster-wise manner. The process can include generating, by the cluster head, a status information transmission to be transmitted by using broadcasting resources.

According to a fourth embodiment, a method can comprise transmitting, by a cluster member enabled to perform device-to-device communications, a request message to a cluster head of a device-to-device cluster. The request message comprises a request to occupy at least one channel. The method can also include monitoring, by the cluster member, the latest updated status information on channel resources for obtaining information whether the at least one channel is occupyable by the cluster member.

In the method of the fourth embodiment, transmitting the request message comprises transmitting an identity of the cluster member and/or a reason for the request.

In the method of the fourth embodiment, if, in the status information, the at least one channel is informed to be occupied, the method includes transmitting on the at least one channel. If, in the status information, the at least one channel is informed free, the method includes transmitting a request message to the cluster head of the device-to-device cluster. The request message comprises a request to occupy at least one other channel.

In the method of the fourth embodiment, the monitoring comprises monitoring broadcasting resources.

In the method of the fourth embodiment, the monitoring comprises monitoring the latest updated status information on the channel resources for obtaining information whether an occupied channel can be occupied by the cluster member.

According to a fifth embodiment, an apparatus includes at least one processor. The apparatus also includes at least one memory including computer program code. The at least one memory and the computer program code can be configured, with the at least one processor, to cause the apparatus at least to transmit a request message to a cluster head of a device-to-device cluster. The request message comprises a request to occupy at least one channel. The apparatus can also monitor the latest updated status information on channel resources for obtaining information whether the at least one channel is occupyable by the apparatus.

In the apparatus of the fifth embodiment, transmitting the request message comprises transmitting an identity of the apparatus and/or a reason for the request.

In the apparatus of the fifth embodiment, if, in the status information, the at least one channel is informed to be occupied, the apparatus is caused to transmit on the at least one channel. If, in the status information, the at least one channel is informed free, the apparatus is caused to transmit a request message to the cluster head of the device-to-device cluster. The request message comprises a request to occupy at least one other channel.

In the apparatus of the fifth embodiment, the monitoring comprises monitoring broadcasting resources.

In the apparatus of the fifth embodiment, the monitoring comprises monitoring the latest updated status information on the channel resources for obtaining information whether an occupied channel can be occupied by the apparatus.

According to a sixth embodiment, a computer program product can be embodied on a non-transitory computer readable medium. The computer program product can be configured to control a processor to perform a process comprising generating, by a cluster member enabled to perform device-to-device communications, a request message to a cluster head of a device-to-device cluster. The request message comprises a request to occupy at least one channel. The process can include monitoring, by the cluster member, the latest updated status information on channel resources for obtaining information whether the at least one channel is occupyable by a cluster member.

According to a seventh embodiment, an apparatus can comprise means for updating status information on channel resources. The channel resources are configured for device-to-device communication by a cluster-wise manner. The apparatus can also include means for transmitting the status information by using broadcasting resources.

In the apparatus of the seventh embodiment, the updating comprises monitoring free and/or occupied channel resources within the cluster in charge of a cluster head considering other interfering clusters.

In the apparatus of the seventh embodiment, the apparatus can also include means for determining a limited set of free channel resources to be included in the updated status information based on monitoring free and/or occupied channel resources within the cluster, and a capability and a condition of a cluster head.

In the apparatus of the seventh embodiment, the apparatus can also include means for receiving a request message from a cluster member enabled to perform device-to-device communication. The request message requests that the cluster member be authorized to occupy at least one channel of the channel resources.

In the apparatus of the seventh embodiment, the apparatus can also include means for transmitting channel information, the channel information comprising at least one of the following: information about channel configuration, transmission mode, resource allocation, scheduling information, radio service and/or service profile thereof, and Quality of Service parameters.

In the apparatus of the seventh embodiment, the apparatus can also include means for allocating at least one signaling channel for signaling with cluster members, in which the signaling channel may be used for the transmitting alongside with the broadcasting resources or exclusively.

In the apparatus of the seventh embodiment, the updating and the transmitting are performed by a cluster head or a cluster manager.

According to an eighth embodiment, an apparatus can comprise means for transmitting a request message to a cluster head of a device-to-device cluster. The request message comprises a request to occupy at least one channel. The apparatus can also include means for monitoring the latest updated status information on channel resources for obtaining information whether the at least one channel is occupyable by a cluster member.

In the apparatus of the eighth embodiment, transmitting the request message comprises transmitting an identity of the cluster member and/or a reason for the request.

In the apparatus of the eighth embodiment, if, in the status information, the at least one channel is informed to be occupied, the apparatus transmits on the at least one channel. If, in the status information, the at least one channel is informed free, the apparatus transmits a request message to the cluster head of the device-to-device cluster. The request message comprises a request to occupy at least one other channel.

In the apparatus of the eighth embodiment, the monitoring comprises monitoring broadcasting resources.

In the apparatus of the eighth embodiment, the monitoring comprises monitoring the latest updated status information on the channel resources for obtaining information whether an occupied channel can be occupied by a cluster member.

BRIEF DESCRIPTION OF THE DRAWINGS

For proper understanding of the invention, reference should be made to the accompanying drawings, wherein.

DETAILED DESCRIPTION

Figure 1:
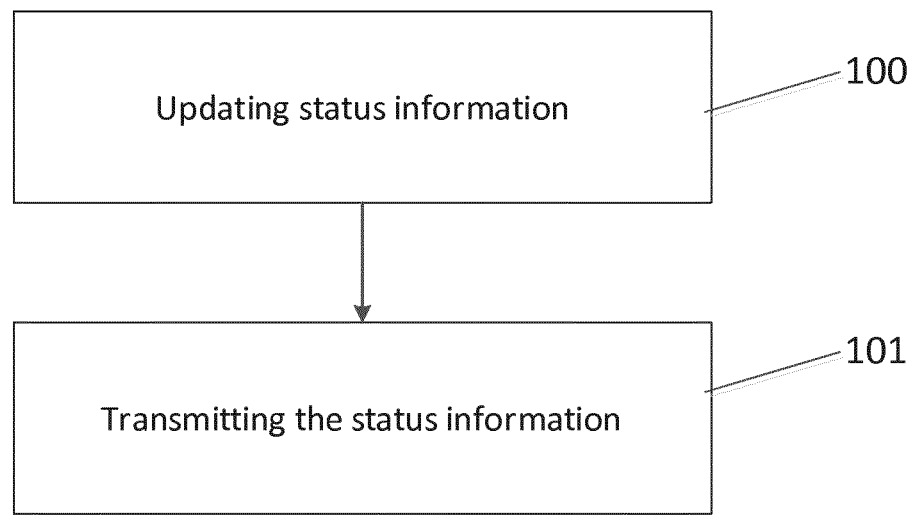
FIG. 1 illustrates a flowchart of a method in accordance with embodiments of the invention.

Embodiments of the present invention are directed to providing Proximity Services (ProSe) and Device-to-Device (D2D) communications. D2D communications can be used for public safety (PS) communication.

ProSe D2D communications can be supported by a star-topology D2D cluster. A star-topology D2D cluster is a topology which is supervised by a central device referred to as the cluster head (CH). The CH can coordinate the reception and transmission of information between itself and other devices which form the members of a cluster. The CH is also a member of the cluster and, therefore, may determine to configure itself or a set of channels to occupy for transmitting/communicating/serving individual UEs/UE groups/or all UEs within the cluster.

Embodiments of the present invention seek to provide a comprehensive approach to facilitate robust D2D communications on top of a broadcast layer, such as Layer 1 (L1). Embodiments of the present invention propose an effective channel allocation scheme with signalling mechanisms.

Embodiments of the present invention can be directed at providing D2D communications within a cluster, such as a star-topology D2D cluster. In embodiments of the present invention, the communications within the star-topology D2D cluster can be achieved using broadcast-based L1 communication. In one embodiment, the star-topology D2D cluster can form and operate autonomously for performing functions related to public safety (PS). For example, the cluster can operate in out-of-coverage scenarios.

In order to properly operate in out-of-coverage scenarios, embodiments of the present invention generally address: (1) how a capable device (that may not yet be a member of any D2D cluster) discovers the CHs that exist locally, and how, based on the results of the discovery, the capable device configures itself to operate as a new CH or joins an existing D2D cluster as a new member; (2) how a capable device communicates with an existing CH upon joining a cluster corresponding to the existing CH; (3) how members of a cluster communicate with a corresponding CH or with each other; (4) whether and how members of different clusters, which are in D2D communication range of each other, may conduct direct D2D communication.

With regard to using D2D communications in in-coverage scenarios, with possible network control or assistance, embodiments of the present invention can determine how a serving eNB can help in coordinating, simplifying, or optimizing the operations of a D2D cluster.

Embodiments of the present invention are directed to a solution that does not make CH much different or far more complex to operate than the rest of member devices in terms of UE capability, and embodiments of the present invention also reduce signalling and processing overhead. Embodiments of the present invention enable a capable device to initiate joining a cluster in a simple and effective manner. Embodiments of the present invention enable basic communication between a CH and the member of a respective cluster, as well as enable communications between members of the cluster in an effective manner.

According to the previous approaches, a D2D-capable UE/device can be deployed in a pre-configured carrier to be either a CH of a cluster or to be a possible member of an already-existing cluster. The deployment of a D2D-capable device (such as an autonomous initial deployment of a D2D-capable device) is generally configured in such a way that minimizes the overall number of clusters. In other words, according to the previous approaches, a newcomer device (a device that may not yet be a part of any cluster) should try to discover and join an existing cluster first, and, if joining an existing cluster is not possible for the newcomer device, then the newcomer device may then deploy itself as a CH.

In general, the deployment of a D2D cluster can be deployed in a manner to enable spatial reuse of allocated-carrier-spectrum resources, similar to an uncoordinated deployment of femtos or local Access Points (in which a cluster can self-configure its spectrum resources based on collective knowledge of a surrounding radio environment). Here, any policies or rules associated with the deployment are generally pre-configured.

In the previous approaches, a CH can also be configured to form a set of pre-defined radio channel resources, which can be used for D2D communication within a cluster. The CH can be configured by itself (in autonomous operation), or the CH can be configured by a serving network (in network-controlled operation). Furthermore, the CH can have a pre-allocated broadcast control channel which can correspond to a beaconing channel. The pre-allocated broadcast control channel can be used to send control information to members of the cluster, or information about the broadcast control channel of the CH can be indicated in the beaconing channel so that members of the cluster can find and listen to that channel. The broadcast control channel of the CH may also have a primary and secondary structure for enhancing the flexibility and/or enhancing the capacity of the broadcast-control signalling. When communication is broadcasted within the cluster, any device which is able to listen to the service may be considered as a member of the cluster. Those members which generally only listen and do not transmit at all can be referred to as passive members of the cluster. Those members of the cluster who also transmit communication in addition to possible listening can be considered to be active members. Each device/user equipment (UE) corresponding to a member can be a passive member at one time, and can be an active member at other times. Each active member can be assigned with at least one of the available channels for transmission.

The above-described channel here can refer to, for example, any pre-configured time-frequency-code-space resources. Scheduling information for transmitting/receiving the channel can be configured in a semi-persistent allocation fashion, as sensible for the assumed broadcast nature of all possible L1 channels. Scheduling information can be considered as the time-sharing dimension of the channel. For example, the basic channelization can be based on an LTE physical-resource block (PRB) (for example, 10 MHz can be mapped to 50 PRBs). Then, one channel can correspond to 1 PRB or multiple PRBs, depending on the CH configuration. Furthermore, a time-sharing possibility may be taken into account when specifying the channels, realized with, for example, some modification period (on the basis of system-frame number (SFN), for example) and scheduled transmit occasions (on the basis of sub-frames) within each modification period. That is, the same basic channel can be further resolved in scheduling time to make multiple channels for different users to occupy in time-sharing fashion. Hence, one cluster may have tens or hundreds of corresponding channels and, hence, the channelization can be scalable.

In embodiments of the present invention, a CH can keep updating cluster-wise available channel resources (such as L1 channel resources), including all occupied channels (and corresponding active members) and free channels. Updating can be generally understood as: (1) forming/deciding an initial pool of available resources at the start of CH operation, and (2) monitoring and being aware, by the CH, of an up-to-date situation/status of the available resources as well as the used resources (as the pool of resources may change in time due to either a change in the dynamic radio environment, uses within the cluster by the CH and cluster members, or both). In embodiments of the present invention, the applied channelization can be semi-static and can be pre-configured to all D2D capable devices. In embodiments of the present invention, the applied channelization can also be more flexible and can be dynamically announced by the CH to an individual cluster. The CH can then indicate/transmit up-to-date information about all occupied channels and indicate/transmit information about at least a set of free channels in a pre-defined broadcast control channel in a timely updating fashion. The CH can monitor the channels corresponding to the transmitted/indicated set of free channels. Therefore, embodiments of the present invention can enable the CH to, on-the-fly, determine a limited set of the free channels to be updated and to transmit/indicate information about the free channels. If a D2D-enabled UE/device wants to get hold of (i.e., occupy) a free channel from the free channel set that is transmitted/indicated by the CH, the UE/device may attempt to transmit on that selected free channel. The UE/device may attempt to transmit, to the CH, a pre-defined request message including the UE's/device's identity and reason for requesting that channel (as members of a cluster are not supposed to listen to free channels, but are supposed to listen to occupied channels of interest). The reason may be, for example, to transmit/communicate with one particular user provided with some pre-configured valid user ID, a group of users with some pre-configured valid group ID, or just to broadcast for all. The request may also specify some certain QoS requirements (data rate, tolerable bit or packet error rate, etc.) and/or number of channels needed. The request may be transmitted in some contention-based fashion, as more than one UE/device may select the same free channel to transmit the request to the CH that accounts for possible contentions. The UE/device can then receive/listen to the updated channel occupancy information sent by the CH in the broadcast control channel to find out whether the UE/device can hold onto the selected free channel and/or any other channel(s) assigned to it for future transmissions or not. In the event that the UE/device can hold onto the selected free channel, the UE/device can then designate the free channel it selects as an occupied channel. In the event that the UE/device cannot hold onto the selected free channel, that free channel remains in the updated set of the free channels, as transmitted/indicated by the CH. The UE/device may further check the updated channel occupancy information to determine whether any other channel is assigned to it provided that its valid user ID of the UE/device that occupies the channel is listed/indicated corresponding to the assigned occupied channel.

In the event that multiple UEs try to occupy the same free channel, the CH may be able to detect such collisions and can then decide whether the CH should keep transmitting/indicating that the channel is a free channel (and not allow any of UE/devices that are currently attempting to occupy the channel to occupy the channel), or assign that channel to one of those attempting UEs/devices which the CH was able to capture from the collision, provided that a valid user ID of the captured UE/device is listed/indicated corresponding to that free channel which is now indicated in the updated channel occupancy information. In other words, in one embodiment of the present invention, the CH resolves possible collisions.

In one embodiment of the present invention, the CH can be pre-configured to determine and to update the set of free channels on-the-fly by indicating the free channels in the broadcast control channel. The set of free channels can be determined based on available channel resources, the number of occupied channels, and the capability of the CH for monitoring a number of indicated free channels. Thus, the indicated set of free channels may change from time to time. The indicated set of free channels can indicate that no free channel is available. In this event, the CH cannot accept any new active member. The CH in this event may also indicate to existing members whether the CH can accept any request for occupying an additional channel from an existing member or not with, for instance, 1 additional bit.

Furthermore, the CH may be configured to control, on-the-fly, a maximum number of channels that an individual device/UE may occupy. The maximum number of channels can be denoted as a variable integer "M." The CH may also be configured to control a maximum number of free channels (out of the transmitted/indicated set of free channels) that an individual device/UE may select (and the number of channel allocation requests that that the device/UE transmits in parallel through), denoted as a variable integer "N." The device/UE can attempt to transmit channel allocation requests in parallel, whether at the same time or not at the same time, depending on a time-sharing manner in channelization. The CH may determine the updated values of M and N based on up-to-date availability of channel resources and user needs. The CH may then indicate the values of M and N in the broadcast control channel.

In embodiments of the present invention, UEs/devices can be pre-configured with rules to derive the valid M and N values, based upon updated information of the available channel resources and the size of the free channel set indicated by the CH.

In embodiments of the present invention, the default values of "M" and "N" can be M=1 and N=1, if M and N are omitted from the updated broadcast control information of the CH.

In embodiments of the present invention, the indication of individually-occupied channels in the broadcast control of the CH includes information of target receiving UEs/devices. The information of the target UEs/devices can include some valid identity of an intended receiving device/UE (for unicast), device/UE group (for groupcast), or otherwise nothing (for broadcast). Based on targeted receiving UEs/devices information of individually-occupied channels indicated in the broadcast control of the CH, a corresponding UE/device as the cluster member can listen to and receive from the indicated occupied channels.

In embodiments of the present invention, the following options can be used to optimize signalling overhead in transmitting/indicating up-to-date information on the occupied channels and the currently-free channels:

If available channels can be represented by some unique profile identification (ID) and/or a pre-defined channel index (which can be used to map on the actual configuration and allocation details of the channel), such ID or index can be used to indicate individual channels in the updated broadcast control information of the CH. This embodiment can imply some semi-static uniform channelization.

In case channelization is more flexible, indication about specific channels may need to be detailed, including information about channel configuration, transmission mode, resource allocation and scheduling information, radio service or service profile information, and/or quality-of-service (QoS) parameters.

In order for the CH to indicate the occupied channels or, that is, the channel occupancy information, in one embodiment, if the details about the individually-occupied channels are provided, then information about the corresponding transmitters (such as some valid identity of the transmitting device/UE) may be omitted, as the intended receiver(s) can find out about the transmitter when receiving the channel. This is determined by the CH on the individual channel basis.

If some valid identity of a transmitting device/UE is indicated, then details of the channel(s) occupied by that transmitting device/UE may be omitted, provided that the intended receiver(s) may re-discover the transmitting device/UE based on the given identity and can get all the details of the occupied channels from the respective beaconing or broadcast control channel. This is determined by the CH on the individual active member basis.

Multiple options may be applied, which can be controlled by the CH upon or during the channel occupation. A first option that omits information about corresponding transmitters may be preferable for open broadcast services or in the event that members are not able nor allowed to broadcast information. A second option that indicates a valid identity of a transmitter may be preferable for unicast or for individual active members or, in some special events such as the collision resolution, the allocation of other than the selected free channel described above. For instance, important or resourceful active members (which may have more than one channel allocated to them) may be better positioned to advertise their occupied channels and respective services by themselves, reducing the signalling burden for the CH.

In one embodiment, a hybrid option of the aforementioned options can be introduced in which the CH indicates one occupied channel per one active member, regardless of how many occupied channels an active member is allocated, provided that information about any additional occupied channels of an active member is indicated by that active member on its occupied channel that is indicated by the CH (referred to as the primary occupied channel of the active member).

In one embodiment, due to some event-based need (requesting for channel release or change, or indicating or reporting an urgent matter such as detected security risks, etc.), the CH may exclusively allocate one or several channels to address the need. The CH may also allow for active members to attempt to use one of the indicated free channel (s) for sending urgent signalling to the CH.

By following updated information about the occupied channels and free channels from the CH, a UE/device may know its own status as well as the status of other users. In other words, that updated information from the CH can include all possible primitives: request, indication, response, or confirmation to users. This can be used for facilitating and enhancing both discovery and communication in ProSe.

For autonomous D2D communications, the above-described embodiments can be implemented using hard-coded pre-configurations and by using a self-organizing capability of D2D devices. In order to enhance (fasten) the discovery of CHs for local capable devices, some predefined exclusive set of beaconing resources per a carrier (such as an L1 sequence, an L1 ID, and/or a time-frequency channel for beaconing or primary broadcast control), specifically for CH devices, may be introduced. These resources can be preconfigured to all D2D capable devices for certain operating carrier(s) (hard-coded for autonomous D2D communications at least, preconfigured by the network upon initial registration or registration update on the D2D registration-area basis or preconfigured by the network on a cell basis using broadcast system information for network assisted D2D communications).

In embodiments of the present invention, a CH can keep updating cluster-wise available L1 channel resources (including all occupied channels and free channels) based on considerations within a cluster as well as considerations between different clusters (as there can be more than 1 interfering cluster operating in the local area). The CH first needs to initially form the pool of L1 resources. The pool of L1 resources can be formed based on detection and discovery of possible interfering clusters nearby and resources thereof, for example. Then, the resource pool may be monitored and updated on the fly based also on measurement reports on interfering clusters from cluster members. For within a cluster, the CH may need to monitor/receive the indicated free channels and some occupied channels of interest. Based on the monitoring/receiving, CH can update the information about the free-occupied channels within the cluster.

In view of the above, first, the CH obtains information on resources allocated to clusters that possibly cause interference. If the CH does not obtain any such information, the CH may then regard itself as an isolated CH, and the CH can use all the carrier resources or a predefined portion of the carrier resources, as pre-configured.

Second, the CH monitors the resources to obtain information on the usage status of the resources.

Third, the CH determines and updates free and/or occupied resources within its cluster based on the results of monitoring for resource configuration, the current available resources, and the use thereof within the cluster.

With regard to how the free channel set is determined, consider an example of a CH operating on a 10 MHz LTE carrier and that has a pool of 50 channels indexed as 1-50. In the beginning, all of the 50 channels are free and the CH can decide to indicate a set of 10 free channels $\{1, \ldots, 10\}$, as monitoring all 50 channels in parallel can be too burdensome or can be impossible for the CH. Some status/condition/capability of the CH coupled with the amount of free channels that are available can be used as a criteria to determine a preferred/optimized free set. Then, suppose a first member is randomly selects one of the indicated free channels (Channel 7, for example) to attempt sending a request to the CH, and further suppose that the first member successfully gets hold of Channel 7 (the CH monitored and received the request of the member on Channel 7). The CH then determines and indicates that Channel 7 is occupied and that the updated free channel set corresponds to $\{1 \ldots 6, 8, 9, 10, 11\}$. As the numbers of active members and occupied channels increase, at a certain time in the CH operation's lifetime, suppose that the CH has 30 members and that 43 channels are occupied by those 30 members. The indicated free channel set may now be, for example, $\{47, 50\}$. The CH may determine that 30 members are the maximum number it can handle, and then the CH will not indicate that any free channel are available even if 7 more free channels may still be available. In this case, the existing members may be still allowed to request additional channels via their existing allocated channels. Taking into account that there may be other clusters operating nearby and interfering with the cluster of interest, the pool of available channel resources for the cluster of interest may vary in time (monitored and updated by the CH based on, for example, collective measurements and reports of the CH and cluster members).

Examples of the above-described status/condition include: a battery status of the CH, a service condition of the CH (the CH may also have some services for itself or an active member which may need to transmit and receive data besides the CH role in controlling aspects or the CH can be in an in-coverage scenario), an inter-cluster interference condition (the condition may correspond to a stand-alone CH or have many other interfering CH around), for example.

Examples of the capability/capacity of the CH include a maximum number of members or free/occupied channels the CH can handle.

"M" and "N" can represent a capability of devices, as well as a flexibility, a scalability, a capacity and an optimization possibility for system operation. With regard to deciding/deriving the values of M and N, when the number of free channels in the pool is plenty (and the size of an indicated set is large), then M and N can be set to their maximum limits. When either the pool/set is small, then M and N can be set by default. In this regard, the rules can be provided with some pre-defined thresholds. However, it may be more practical/straightforward for the CH to indicate the values of M and N.

The pre-configurations applied for facilitating autonomous D2D communications herein may include possible carrier(s) and channelization thereof (channel structures, configurations for transmitting/receiving pre-defined channels, etc.), maximum limits of M and N and possible rules thereof, rules and parameters for a CH to decide on indicated channel sets, parameters for determining how to interpret such indications, for example. Autonomous D2D can, in principle, be based upon pre-configurations, provided by a device vendor (with the pre-configurations hard-coded in software) and operate in, for example, a subscription profile or off-line, and in a network upon a registration/registration update. The pre-configuration is carried out first by standards and then by implementation. The implementation can be performed via a software update to devices and a parameter setting, and the update can be performed either by a human, by a network, or by both a human and a network.

For network-controlled D2D communications, many elements may be realized using possible assistance services from a network (such as assistance services from a serving evolved Node B (eNB)). The serving eNB may be considered as a coordination point or as a master of all CHs operating inside a corresponding cell of the serving eNB. In this regard, the serving eNB may be able to take over or provide assistance in any functions of the CH towards members using cellular access. The serving eNB may select and configure certain capable UE to operate as CH with certain sets of channels in a coordinated fashion. The serving eNB may then advertise about CHs to D2D-capable UEs inside the cell to discover and eventually join some clusters.

In principle, the network can provide a wide variety of possible assistance. In one embodiment, a new physical channel D2D-physical-downlink-control channel (PDCCH) or higher-layer D2D-broadcast-control-channel/system-information-block (BCCH/SIB) can be used by the eNB to signal channel information. The channel information can be structured or resolved on a CH-basis or a UE-basis over the cell. Because the eNB may be seen as a special CH (master of all CHs) in controlling radio access for users inside the cell including all clusters and CHs thereof, the eNB can function along the above-described functions of the CH.

FIG. 1 illustrates a flowchart of a method in accordance with embodiments of the invention. The method illustrated in FIG. 1 includes, at 100, updating status information on channel resources. The channel resources are configured for device-to-device communication by a cluster-wise manner. The method also includes, at 101, transmitting the status information by using broadcasting resources.

Figure 2:
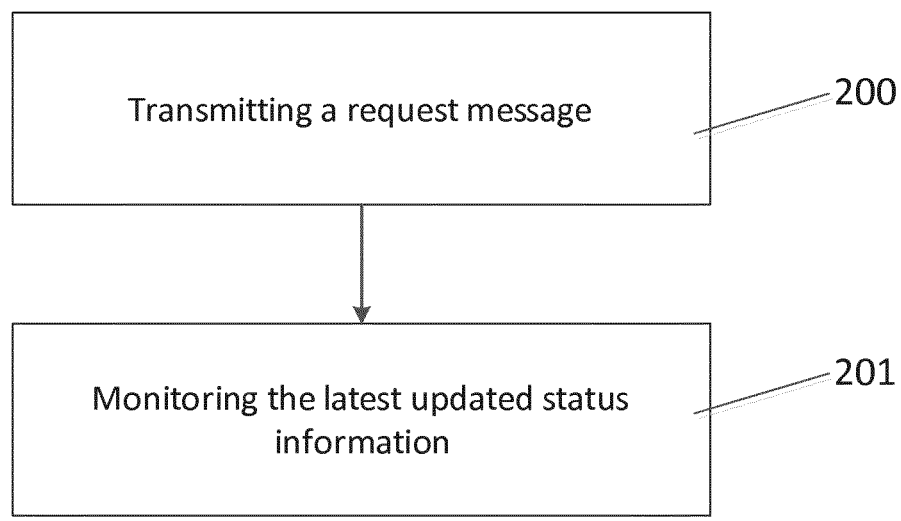
FIG. 2 illustrates a flowchart of a method in accordance with embodiments of the invention.

FIG. 2 illustrates a flowchart of a method in accordance with embodiments of the invention. The method illustrated in FIG. 2 includes, at 200, transmitting a request message to a cluster head of a device-to-device cluster. The request message comprises a request to occupy at least one channel. The method, at 201, also includes monitoring the latest updated status information on channel resources for obtaining information whether the at least one channel can be occupied by the cluster member.

Figure 3:
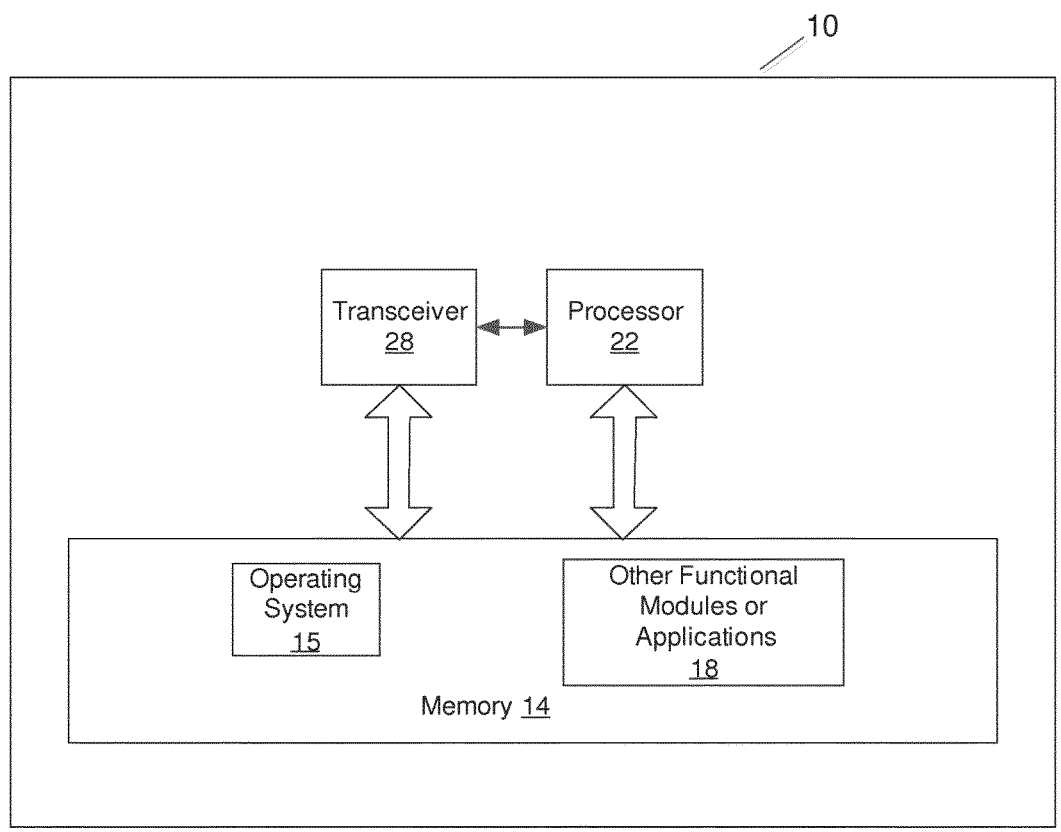
FIG. 3 illustrates an apparatus in accordance with embodiments of the invention.

FIG. 3 illustrates an apparatus in accordance with embodiments of the invention. In an embodiment, the apparatus can be a user device or user equipment (UE) operating as a cluster member. In another embodiment, the apparatus may be a user device operating as a cluster head. In another embodiment, the apparatus can be any D2D-enabled device. In yet another embodiment, the apparatus may be a node operating as a cluster manager. A cluster manager may be an evolved Node B managing or controlling the D2D cluster at issue. Apparatus 10 can include a processor 22 for processing information and executing instructions or operations. Processor 22 can be any type of general or specific purpose processor. While a single processor 22 is shown in FIG. 3, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), digital signal processing devices (DSPDs), programmable logic devices (PLDs), processors, processors based on a multi-core processor architecture, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

Apparatus 10 may be, include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a user device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Depending on the processing power needed, the computer program may be executed in a single electronic digital computer or it may be distributed amongst a number of computers. The computer readable medium or computer readable storage medium may be a non-transitory medium.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 4:
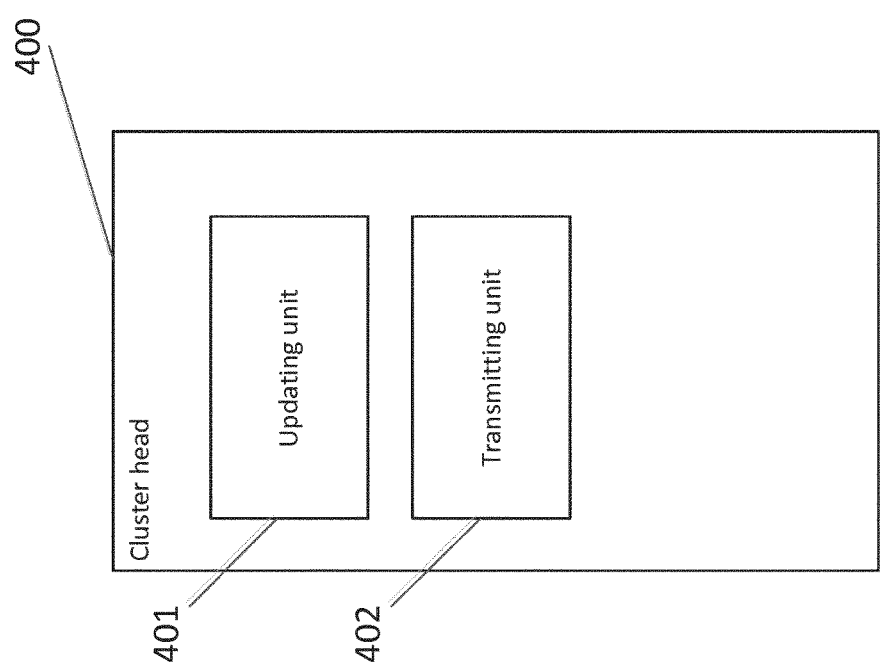
FIG. 4 illustrates an apparatus in accordance with embodiments of the invention.

FIG. 4 illustrates an apparatus in accordance with embodiments of the invention. Apparatus 400 can be a cluster head or a cluster manager, for example. Apparatus 400 can include an updating unit 401 that updates status information on channel resources. The channel resources are configured for device-to-device communication by a cluster-wise manner. Apparatus 400 can also include a transmitting unit 402 that transmits the status information by using broadcasting resources.

Figure 5:
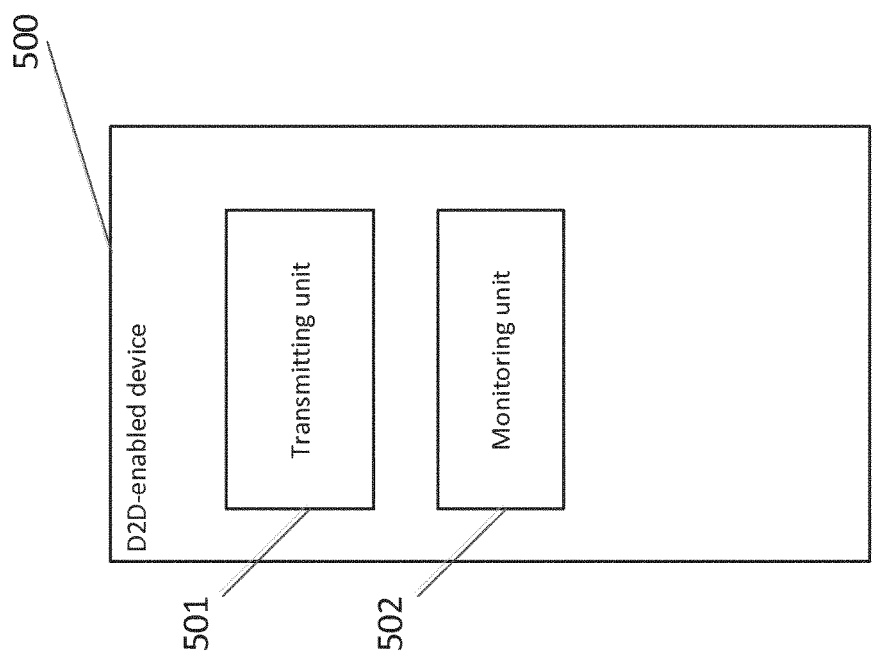
FIG. 5 illustrates an apparatus in accordance with embodiments of the invention.

FIG. 5 illustrates an apparatus in accordance with embodiments of the invention. Apparatus 500 can be a device capable of device-to-device communication, for example. Apparatus 500 can include a transmitting unit 501 that transmits a request message to a cluster head of a device-to-device cluster. The request message comprises a request to occupy at least one channel. Apparatus 500 can also include a monitoring unit 502 that monitors the latest updated status information on channel resources for obtaining information whether the at least one channel can be occupied by the cluster member.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   receiving, by a cluster member of a device-to-device cluster, status information about occupied and free channel resources from a cluster head of the device-to-device cluster;
   transmitting on a selected free channel resource, wherein the selected free channel resource is a free channel that the cluster member wishes to occupy;
   monitoring, by the cluster member, for updated status information on channel resources received from the cluster head for obtaining information whether the cluster member may occupy the at least one channel; and
   if, in the updated status information received from the cluster head, the at least one channel is informed to be occupied, then the cluster member may occupy the at least one channel.

2. The method according to claim 1, wherein transmitting the request message comprises transmitting an identity of the cluster member or a reason for the request.

3. The method according to claim 1, further comprising:
   if, in the latest updated status information, the at least one channel is informed to be occupied,
   transmitting on the at least one channel; and
   if, in the latest updated status information, the at least one channel is informed free,
   transmitting a request message to the cluster head of the device-to-device cluster, wherein the request message comprises a request to occupy at least one other channel.

4. The method according to claim 1, wherein the monitoring comprises monitoring broadcasting resources.

5. The method according to claim 1, wherein the monitoring comprises monitoring the latest updated status information on the channel resources for obtaining information whether an occupied channel can be occupied by the cluster member.

6. An apparatus, comprising:
   at least one processor; and
   at least one memory including computer program code, the at least one memory and the computer program code configured, with the at least one processor, to cause the apparatus at least to receive status information about occupied and free channel resources from a cluster head of a device-to-device cluster, wherein the apparatus is a cluster member of the device-to-device cluster;

transmit on a selected free channel resource, wherein the selected at least one free channel resource is a free channel that the apparatus wishes to occupy;

monitor for updated status information on channel resources received from the cluster head for obtaining information whether the apparatus may occupy the at least one channel or not; and if, in the updated status information received from the cluster head, the at least one channel is informed to be occupied, then the apparatus may occupy the at least one channel.

7. The apparatus according to claim 6, wherein transmitting the request message comprises transmitting an identity of the apparatus or a reason for the request.

8. The apparatus according to claim 6, wherein if, in the latest updated status information, the at least one channel is informed to be occupied, the apparatus is caused to transmit on the at least one channel; and if, in the latest updated status information, the at least one channel is informed free, the apparatus is caused to transmit a request message to the cluster head of the device-to-device cluster, wherein the request message comprises a request to occupy at least one other channel.

9. The apparatus according to claim 6, wherein the monitoring comprises monitoring broadcasting resources.

10. The apparatus according to claim 6, wherein the monitoring comprises monitoring the latest updated status information on the channel resources for obtaining information whether an occupied channel can be occupied by the apparatus.

\* \* \* \* \*